US006996690B2

(12) United States Patent  (10) Patent No.: US 6,996,690 B2
Nakamura et al.  (45) Date of Patent: Feb. 7, 2006

(54) STORAGE SYSTEM INCLUDING MULTIPLE CONTROL UNITS FOR INCREASED RELIABILITY DURING A FAILURE

(75) Inventors: Shuji Nakamura, Yokohama (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 285 days.

(21) Appl. No.: 10/648,291

(22) Filed: Aug. 27, 2003

(65) Prior Publication Data

US 2005/0021906 A1   Jan. 27, 2005

(30) Foreign Application Priority Data

Jul. 22, 2003  (JP)  ............................. 2003-199581

(51) Int. Cl.
  *G06F 12/16*  (2006.01)
(52) U.S. Cl. ...................... 711/162; 711/161; 714/5; 714/6
(58) Field of Classification Search ............... 711/113, 711/114, 118, 119, 130, 161–162; 714/1, 714/2, 13, 5, 6, 7
See application file for complete search history.

(56) References Cited

U.S. PATENT DOCUMENTS

| 5,771,367 | A |   | 6/1998  | Beardsley et al. |         |
|-----------|---|---|---------|------------------|---------|
| 5,809,543 | A |   | 9/1998  | Byers et al.     |         |
| 6,006,342 | A |   | 12/1999 | Beardsley et al. |         |
| 6,061,504 | A | * | 5/2000  | Tzelnic et al.   | 709/219 |
| 6,205,481 | B1| * | 3/2001  | Heddaya et al.   | 709/226 |
| 6,247,099 | B1| * | 6/2001  | Skazinski et al. | 711/141 |
| 6,279,078 | B1| * | 8/2001  | Sicola et al.    | 711/119 |
| 6,681,339 | B2| * | 1/2004  | McKean et al.    | 714/5   |
| 6,760,765 | B1| * | 7/2004  | Asai et al.      | 709/226 |
| 2002/0133735 | A1 | | 9/2002 | Mckean et al. | |
| 2004/0010659 | A1 | | 1/2004 | Inoue | |
| 2004/0153727 | A1 | | 8/2004 | Hicken et al. | |

FOREIGN PATENT DOCUMENTS

JP  09265435  10/1997
JP  2001/344154  12/2001

* cited by examiner

*Primary Examiner*—T Nguyen
(74) *Attorney, Agent, or Firm*—Mattingly, Stanger, Malur & Brundidge, P.C.

(57) ABSTRACT

The present invention provides a storage system capable of having a large-scale configuration for maintaining a write access response speed and reliability upon an occurrence of a failed cache and its control method. Plural clusters that control a disk drive connected thereto and have a cache memory are connected to one another through a cross coupling network, and write data in the cache memory of another cluster is mutually made redundant in the cache memories in two clusters that jointly use the same disk drive. When a failure occurs in the cache memory, the cluster that uses the disk drive jointly with the cluster having the cache memory in which the failure occurs performs processing for getting access to the disk drive performed by the cluster having the cache memory in which the failure occurs, and the other normally-operated cluster is caused to perform to only make redundant the write data in the cache memory in its cluster.

20 Claims, 15 Drawing Sheets

FIG. 3

11: MANAGER TABLE (POSSESSED BY HOST ADAPTER 1)

| ACCESS SOURCE DESIGNATING INFORMATION | DESTINATION INFORMATION | | |
|---|---|---|---|
| LU NUMBER | LDEV NUMBER | MASTER CACHE ADAPTER | BACKUP CACHE ADAPTER |
| 1 | 11 | CA1 | CA2 |
| 2 | 21 | CA2 | CA1 |
| 3 | 41 | CA4 | CA3 |

31: MANAGER TABLE (POSSESSED BY CACHE ADAPTER 3)

| LDEV NUMBER | BACKUP CACHE ADAPTER | VDEV NUMBER | VDEV ADDRESS |
|---|---|---|---|
| 11 | CA2 | 1 | 00000000 ~ 002FFFFF |
| 12 | CA2 | 1 | 00300000 ~ 008FFFFF |
| 13 | CA2 | 2 | 00000000 ~ 006FFFFF |
| 21 | CA1 | 3 | 00200000 ~ 007FFFFF |
| 22 | CA1 | 3 | 00800000 ~ 0087FFFF |

FIG. 9(A)

71: MASTER MANAGER TABLE (POSSESSED BY MANAGER ADAPTER 7)

711: CACHE ADAPTER CORRESPONDING TABLE

| LDEV NUMBER (7111) | MASTER CACHE ADAPTER (7112) | BACKUP CACHE ADAPTER (7113) |
|---|---|---|
| 11 | CA1 | CA2 |
| 12 | CA1 | CA2 |
| 21 | CA2 | CA1 |
| 22 | CA2 | CA1 |
| 31 | CA3 | CA4 |
| 41 | CA4 | CA3 |

712: CACHE ADAPTER PAIR TABLE

| CACHE ADAPTER PAIR (7121) | FAILURE SUPPORT CACHE ADAPTER (7122) |
|---|---|
| (CA1, CA2) | (CA3, CA4) |
| (CA3, CA4) | (CA1, CA2)(CA3, CA4) |
| (CA5, CA6) | CA4 |

| LDEV NUMBER (7111) | MASTER CACHE ADAPTER (7112) | BUCKUP CACHE ADAPTER (7113) |
|---|---|---|
| 11 | CA1 | CA4 |
| 12 | CA1 | CA4 |
| 21 | CA1 | CA3 |
| 22 | CA1 | CA3 |
| 31 | CA3 | CA4 |
| 41 | CA4 | CA3 |

STORAGE SYSTEM INCLUDING MULTIPLE CONTROL UNITS FOR INCREASED RELIABILITY DURING A FAILURE

BACKGROUND OF THE INVENTION

The present invention relates to a storage system provided with a cache memory and a control method of the cache memory.

As a technique for improving a performance of a storage system having plural storage units (hereinafter referred to as just "storage system"), there has been well-known a technique of introducing a volatile semiconductor memory section (hereinafter referred to as "cache memory") to the storage system.

With respect to a data write request, a storage system having a cache memory returns a response of completing the write to a computer that requires the data write at the time when the data is written in the cache memory (hereinafter referred to as just "computer" or "host computer"), while asynchronously writes data to a storage unit. Since the speed of writing data to the cache memory is faster than the storage unit (a disk drive or the like here), the storage system can return the response to the host computer with higher speed.

However, latest data is present only in the cache memory until the data is written in the storage unit, so that the storage system is required to enhance reliability of the cache memory.

A known method as a technique to improve the reliability of the cache memory is the one for establishing a redundant configuration of the cache memory. Methods for establishing the redundant configuration include storing a copy of data in plural cache memories (mirroring) or a cache memory having a RAID construction disclosed in Japanese laid-open publication number Hei 9-265435.

Further, there has been known a control method ("write through control") for surely storing data in the storage unit with respect to each write request in order to maintain the reliability of the storage system also in a case where the redundancy of the cache memory is lost due to a failure or the like of the cache memory. However, the reliability is maintained by the write through control, but the abovementioned advantage of the cache memory is lost, with the result that, even if the cache memory is possessed, the response speed to the write request becomes approximately equal to the case where the cache memory is not possessed.

In view of this, techniques have been devised for increasing the redundancy of the cache memory so as not to require the write through control. Such techniques include, for example, providing a spare cache memory or providing three or more cache memories for which the remaining write data that is to be written in the region covered by the cache memory having the failure occurring is shared by the remaining cache memories as disclosed in Japanese laid-open publication number 2001-344154.

A demand for configuring such a storage system in further a large scale has currently been risen. However, a conventional technique unifiedly utilizes a cache memory. Therefore, as the configuration scale of the storage system becomes large, an access is concentrated on the cache memory or information for managing the cache memory, thereby entailing a problem that a throughput performance of the storage system is difficult to be maintained only by having the cache memory.

Further, the problem same as the abovementioned one is applied to the case of maintaining the reliability of the storage system and write performance in a case where the failure occurs in the cache memory. Specifically, the technique disclosed in the aforesaid Japanese laid-open publication number 2001-344154 unifiedly utilizes the cache memory, so that as the configuration scale of the storage system becomes large, an access is concentrated on the cache memory or information for managing the cache memory upon the occurrence of the failure in the cache memory, thereby entailing a problem that a throughput performance of the storage system is difficult to be maintained only by having the cache memory, and consequently, it is difficult to provide both the enlargement of the configuration scale and the reliability upon the occurrence of the failure.

SUMMARY OF THE INVENTION

An object of the present invention is to provide a storage system capable of having a large-scale configuration for maintaining a write access response speed and reliability upon the occurrence of a failed cache and its control method.

In order to attain the abovementioned object, the present invention comprises the following structure. It is a storage system having plural control units and storage units. Further, each of the plural control units has a memory, for example, a cache memory. In the storage system having this structure, a first control unit among the plural control units, when receiving data from a computer connected to the storage system, stores the received data into the memory possessed by the first control unit and the memory possessed by the other control unit (hereinafter referred to as "a second control unit"), and then, transfers the data to the storage unit.

Moreover, in a case where a failure occurs in the second control unit in the abovementioned configuration, a copy of the data received from the computer is newly stored in the memory of a third control unit.

Additionally, a configuration may be applied wherein the second control unit stores the data received from the computer in the memory possessed by the first control unit and the memory possessed by the second control unit.

Further, in a case where the failure occurs in the second control unit, a configuration may be applied wherein the first control unit which is designated as a pair substitutionally performs a processing of the second control unit. In this case, the first control unit stores a copy of data received from the computer during the substitutional processing of the second processing unit in a memory possessed by the other control unit that is not the pair.

Moreover, a configuration may be applied wherein the first control unit and the second control unit that form a pair respectively is supplied electric power from a separate power supply.

Further, a configuration may be applied wherein the plural control units are connected to one another via a switch.

Additionally, a configuration can also be applied wherein each control unit is connected to computer via an interface unit.

Moreover, a configuration can also be applied wherein the storage system has a management unit that has information showing a corresponding relationship between the plural control units and the storage units, each control unit being operated based upon this information. Further, a configuration can also be applied wherein the storage system does not have a management unit but each control unit has the abovementioned information.

Additionally, the control units that are in pairs is configured to be connected to the same storage unit.

Further, even in the configuration wherein the management unit finds the failure in the control unit, a configuration can also be applied wherein the other control unit or interface unit detects the failure in the control unit.

BRIEF DESCRIPTION OF THE DRAWINGS

FIG. 3 is a view representing management tables 11 and 31;

FIGS. 9(A) and 9(B) are views showing a master management table 71;

DESCRIPTION OF THE PREFERRED EMBODIMENT

An embodiment of the present invention will be explained hereinbelow with reference to drawings. It is needless to say that the present invention is not limited to the embodiments described hereinbelow.

Figure 1:
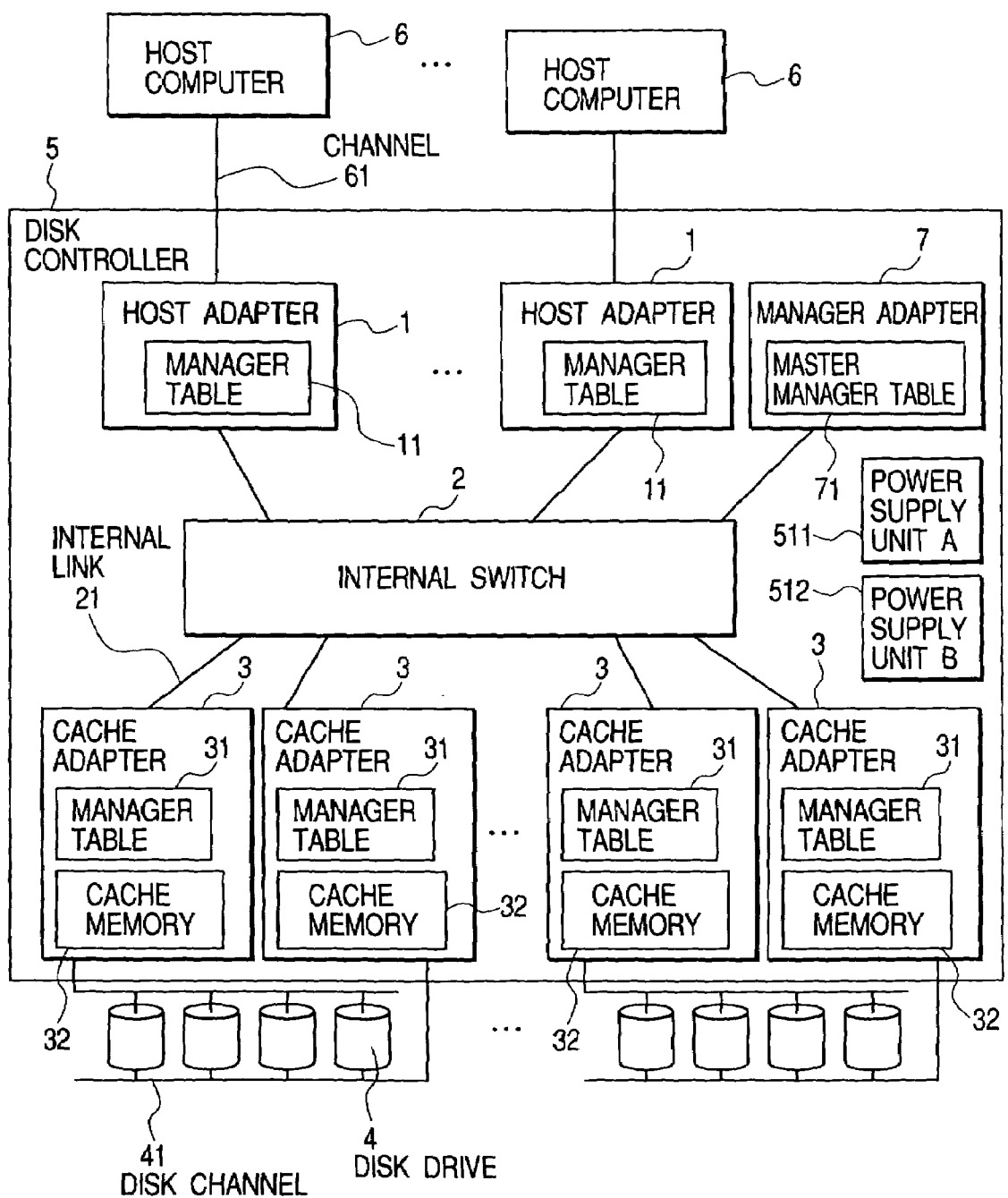
FIG. 1 is a view schematically showing a storage system of a first embodiment according to the present invention.

FIG. 1 is a view showing a first embodiment of a storage system to which the present invention is applied. The storage system has a disk controller 5 and plural disk drives 4. It is to be noted that the disk drive 4 means a storage unit having a non-volatile storage medium such as a hard disk drive, CD, DVD or the like. The disk controller 5 is connected to a host computer 6 via a communication line (hereinafter referred to as "channel") 61. Further, the disk controller 5 and the disk drives 4 are connected to each other via a communication line (hereinafter referred to as "disk channel") 41. The host computer 6 sends or receives data to or from the disk drives 4 via the channel 61, the disk controller 5 and the disk channel 41.

A protocol such as, for example, SCSI (Small Computer System Interface), Fibre Channel, or the like is used at the channel 61 and disk channel 41. Moreover, the channel 61 may be composed of a SAN (Storage Area Network) composed of a fibre channel cable and plural fibre channel switches.

The disk drive 4 has two ports, each of which is connected to the disk controller 5 via a separate disk channel 41. By this, the disk controller 5 can get access to the same disk drive 4 via the plural routes (hereinafter referred to as "path").

The disk controller 5 has plural power supply units A511 and B512, plural host adapters 1 and plural cache adapters 3 and manager adapter 7. Further, the plural host adapters 1 and the plural cache adapters 3 and manger adapter 7 are connected to one another via an internal switch 2. An internal link 21 that is a communication line is utilized for the connection between the internal switch 2 and the cache adapter 3 or the like. In this embodiment, there is a single internal link 21 between the internal switch 2 and each component, but plural internal links 21 may be provided between the internal switch 2 and each component in order to ensure relative redundancy, to secure a communication band in data transmission or to cope with a different packet length used for the communication.

It is to be noted that the manager adapter 7 may be connected to the host adapter 1 or the cache adapter 3 via a network different from the internal link 21. This can separate a network relating to a data transfer from a network relating to receiving and sending information for the system management.

The host adapter 1 is an interface device that receives an access request from the host computer 6 via the channel 1, performs an analysis of the access request based upon a management table 11 provided in the host adapter 1, communicates with a suitable cache adapter 3 via the internal link 21 and returns a response to the host computer 6.

The cache adapter 3 is connected to the disk drive 4 via the disk channel 41 so as to communicate with the host adapter 1 or the other cache adapter 3 via the internal switch 2. Further, the cache adapter 3 controls read of data from the disk drive 4 or write of data to the disk drive 4 based upon the communication from the host adapter 1. Moreover, the cache adapter 3 is a controller for controlling a cache memory 32 possessed by the cache adapter 3 to perform a storage of data to the cache memory 32.

It is to be noted that the cache adapter 3 basically stores in the cache memory 32 only data relating to the read of data or write of data stored in the disk drive 4 connected to itself. In other words, data of the disk drive 4 managed by the other cache adapter 3 is not stored as generally used data in the cache memory 32 of the other cache adapter 3.

The cache adapter 3 also performs a control of a redundancy with respect to the disk drive 4 (for example, making each RAID level redundant). Further, an another port of each disk drive 4 connected to a certain cache adapter 3 via one port is connected to another cache adapter 3 that is in pairs with this cache adapter 3 for making the cache adapter itself redundant.

Although the present embodiment explains about the configuration wherein plural pairs of cache adapters 3 are stored in one disk controller 5, other configuration may be applied wherein a single device is composed of one pair and a disk drive 4 that is common to this pair, such device being connected to one another via the switch. In this case, a device for management (manager adapter) manages each pair via the switch.

The manager adapter 7 is provided with a master management table 71 having registered therein information about the configuration of the storage system. The manager adapter 7 changes the content of the master management table 71 and transmits necessary information to the host adapter 1 or the cache adapter 3 in a case where the configuration or the like of the storage system is changed.

The power supply units A511 and B512 are respectively connected to an external power supply (not shown) such as a commercial power supply for supplying electric power to the storage system. It is desirable that the power supply units A511 and B512 are respectively connected to an external power supply of a different system in order to take precautions against an accident of the power supply. Moreover, electric power is supplied to a cache adapter 3 that pairs with a certain cache adapter 3 from a separate power supply units A511 and B512 in order to ensure a redundancy of the cache adapter 3.

It is to be noted that other device configurations include the one wherein the host adapter 1 is not present and each cache adapter 3 is connected to one another by the switch provided with the management table 11 that is possessed by the host adapter 1. In this case, the switch is connected to plural channels 61. Further, the switch has the management table 11 every channel 61, so that it transfers an access request of the host computer 6 to the cache adapter 3 based upon the respective management tables 11.

Additionally, the cache adapter 3 performs the communication with the host computer 6, protocol conversion or the like that is executed by the host adapter 1 in a case where the switch is utilized.

Figure 2:
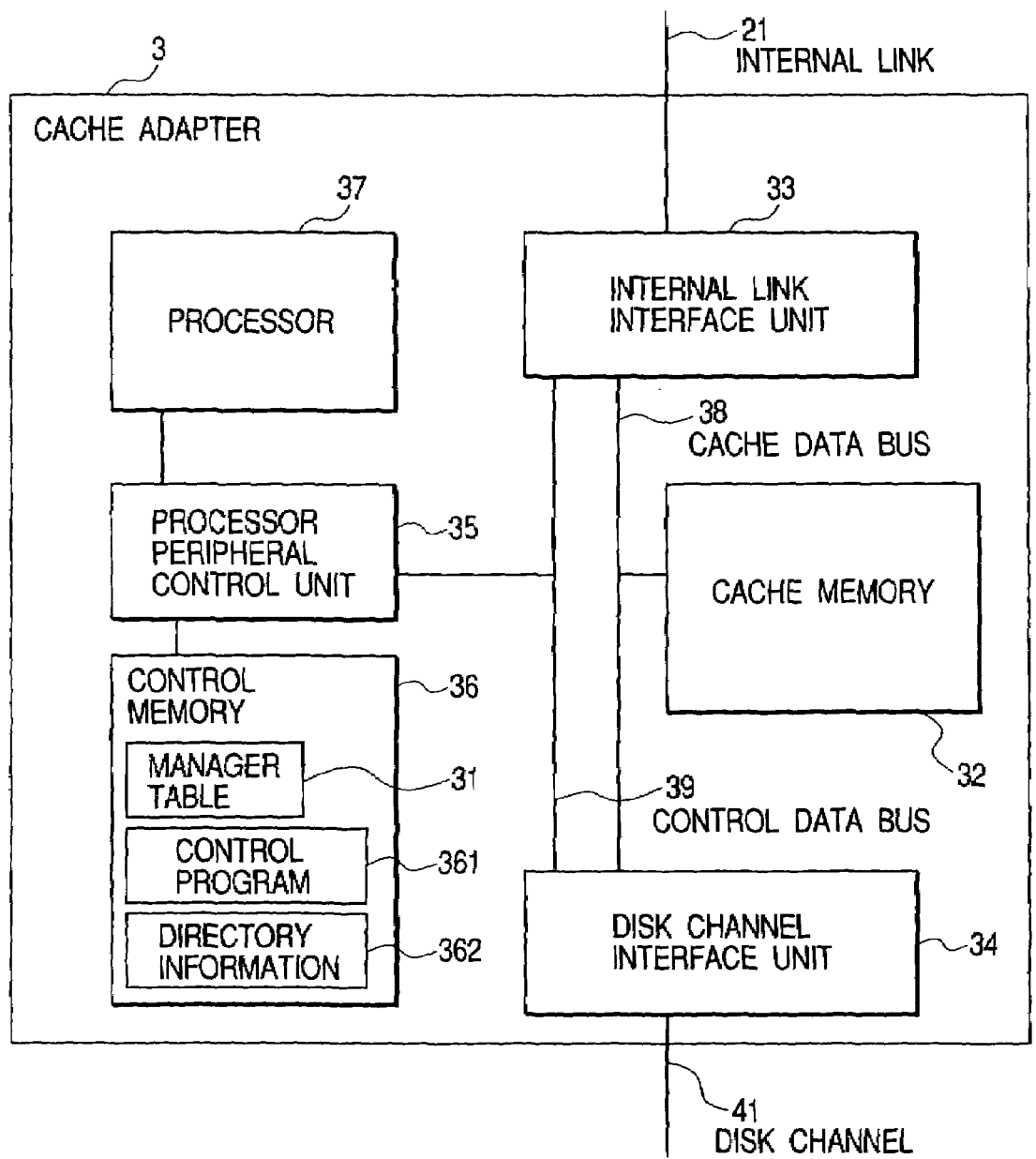
FIG. 2 is a view showing a configuration example of a cache adapter 3.

FIG. 2 is a view representing a configuration example of the cache adapter 3. The cache adapter 3 has a cache memory 32, an internal link interface (hereinafter referred to as "I/F") unit 33 connected to the internal link 21, a disk channel I/F unit 34 connected to the disk channel 41, a processor 37, a control memory 36 and a peripheral control unit 35.

The cache memory 32, internal link I/F unit 33 and the disk channel I/F unit 34 are connected to one another with a cache data bus 38. The internal link I/F unit 34 and the disk channel I/F unit 34 can perform a Direct Memory Access (DMA) transfer between devices. Specifically, the internal link I/F unit 33 stores data received from the host computer 6 via the internal link 21 in the cache memory 32 via the cache data bus 38. When receiving the read request from the host computer 6, the internal link I/F unit 33 takes out the data stored in the cache memory 32 via the cache data bus 38, and then, transfers it to the host adapter 1 through the internal link 21.

The disk channel I/F unit 34 takes out data stored in the cache memory 32 via the cache data bus 38 and stores the same in the disk drive 4 via the disk channel 41 (hereinafter referred to as "destaging"). Further, the disk channel I/F unit 34 takes out data stored in the disk drive 4 via the disk channel 41 and stores the same in the cache memory 32 via the cache data bus 38 (hereinafter referred to as "staging").

The internal link I/F unit 33 and the disk channel I/F unit 34 execute a processing such as the above-mentioned staging and destaging based upon the control of the processor 37 via the control data bus 39.

The processor 37 is connected to the control memory 36 and the control data bus 39 via the peripheral control unit 35 including a memory control circuit or a bus control circuit. Stored in the control memory 36 are the management table 31, control program 361 and directory information 362.

Registered in the management table 31 is information representing a corresponding relationship among a logical device (hereinafter referred to as "LDEV") designated from the host adapter 1, a virtual device (hereinafter referred to as "VDEV") in a case where plural disk drives 4 are virtually managed as one device and the cache adapter 3 (hereinafter referred to as "backup cache adapter") that makes the data stored in the LDEV redundant (copies here) to store it.

The control program 361 is a program executed at the processor 37 when the processor 37 executes a control of each component possessed by the cache adapter 3. The directory information 362 is information representing a storage sate of data in the cache memory 32 such as the existence of the data to be accessed in the cache memory 32, an address in the cache memory or the like.

FIG. 3 is a view showing content examples of the management table 11 possessed by the host adapter 1 and the management table 31 possessed by the cache adapter 3. The management table 11 has plural entries, each of which has fields 111 and 112. The field 111 has registered therein a logical unit number (LU number) designated by the host computer 6 upon the access.

The filed 112 has subfields 1121, 1122 and 1123 in which information relating to the cache adapter 3 is stored. Registered in the subfield 1121 is a logical device number (LDEV number) corresponding to the LU registered in the field 111 and managed by the cache adapter 3. Registered in the subfield 1122 is information showing the cache adapter 3 that executes a staging or destaging, i.e., the cache adapter (hereinafter referred to as "master cache adapter") that executes the normal data write/read to/from the disk drive 4. Registered in the subfield 1123 is information showing the backup cache adapter that makes redundant the data stored in the cache memory 32 of the master cache adapter registered in the subfield 1122.

In the management table 31, mapping information showing a relationship among the LDEV, the VDEV and the backup cache adapter as described above. The management table 31 also has plural entries, each of which has fields 311, 312, 313 and 314. Registered in the field 311 is information showing the LDEV number of the LDEV corresponding to one entry. Registered in the filed 312 is information showing the backup cache adapter that makes redundant the data of the LDEV registered in the field 311.

In the field 313, information showing a VDEV number corresponding to the LDEV registered in the field 311 is registered. Registered in the field 314 is information showing the virtual device address (hereinafter referred to as "VDEV address") representing which section in the corresponding VDEV is allocated to the LDEV registered in the field 311. It is to be noted that the VDEV is designated by an administrator of the storage system through a console connected to an SVP (not shown) or the manager adapter 7 or by transmitting a special command through a channel 61.

If the backup cache adapter registered in the field 312 is the cache adapter 3 having its management table 31, this cache adapter 3 performs a processing for making the write data redundant as the backup cache adapter with respect to the LDEV designated by the LDEV number registered in the corresponding field 311. Specifically, the backup cache adapter receives the write data that is to be made redundant from the host adapter 1 or the master cache adapter 3, and stores the data in the cache memory 32.

Figure 4:
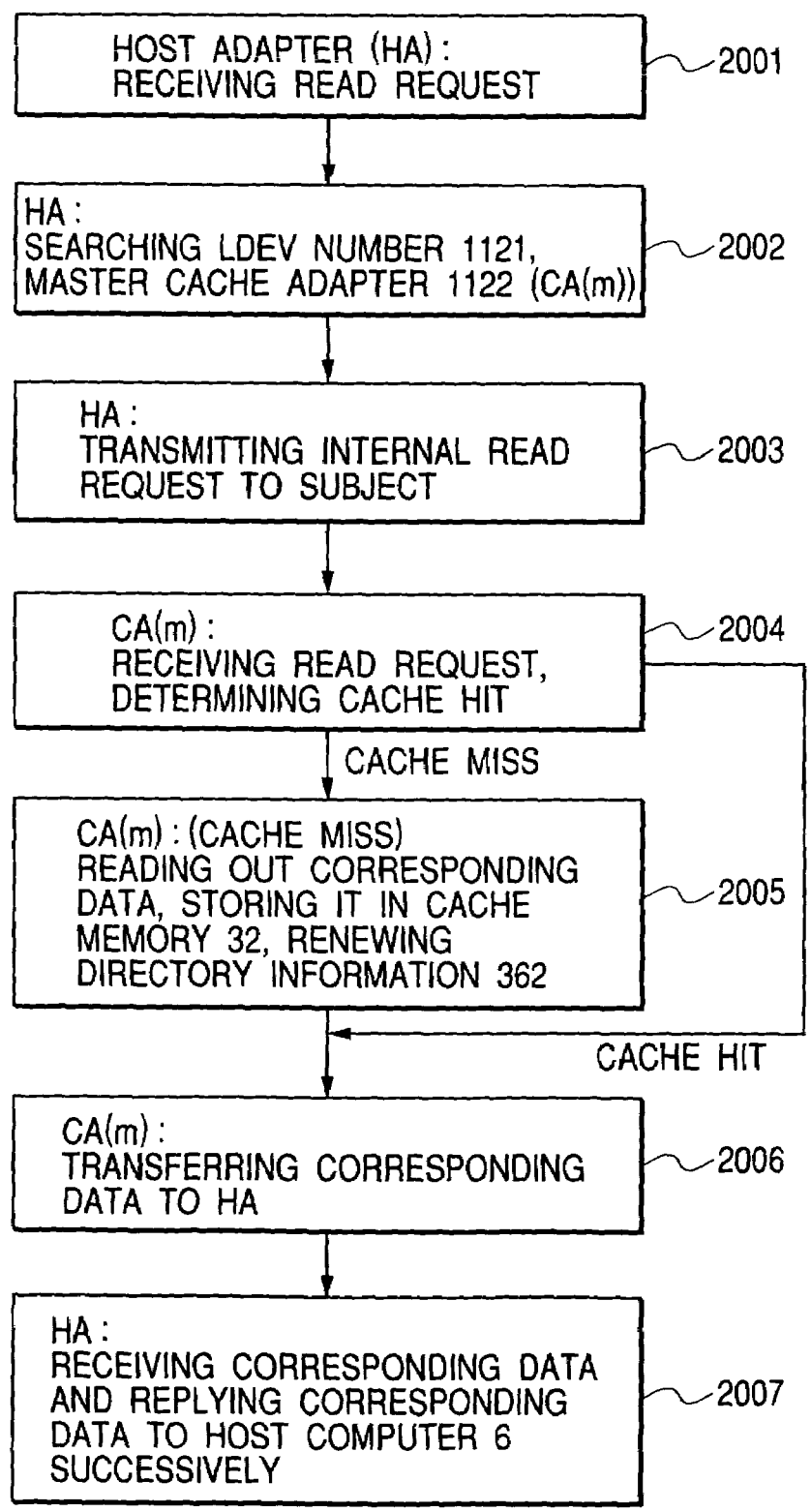
FIG. 4 is a flowchart showing a process flow of a read request.

FIG. 4 is a flowchart showing a procedure at each adapter in a case where the storage system receives the read request from the host computer 6.

Firstly, the host adapter 1 receives the read request from the host computer 6 via the channel 61. The host adapter is described as HA and the master cache adapter is described as CA(m) hereinbelow (step 2001).

The HA1 receiving the read request searches the LDEV number corresponding to the LU number designated by the read request and information of CA(m) from the management table 11 (step 2002). Thereafter, the HA1 transmits the internal read request to the searched CA(m) via the internal link 21. The "internal read(write) request" is here a message of data read (data write) received and sent between the host adapter 1 and the cache adapter 3 (step 2003).

The CA(m) receiving the internal read request determines whether data corresponding to the read request is present or not in the cache memory 32 by the directory information 362 based upon the address, size or the like included in the internal read request (hereinafter referred to as "cache hit determine") (step 2004). In a case where the corresponding data is not present in the cache memory 32 as a result of the determine (hereinafter referred to as "cache miss"), the CA(m) stages the corresponding data from the disk drive 4 to store it in the cache memory 32, thereby renewing the corresponding directory information 362 (step 2005).

After the processing at the step 2005 or in a case where the step 2004 determines that the corresponding data is present in the cache memory 32, the CA(m) reads the corresponding data from the cache memory 32 via the internal link interface unit 33 to thereby transfer it to the HA1 that has sent the internal read request (step 2006).

The HA1 receiving the data responds the received data to the host computer 6 (step 2007).

Figure 5:
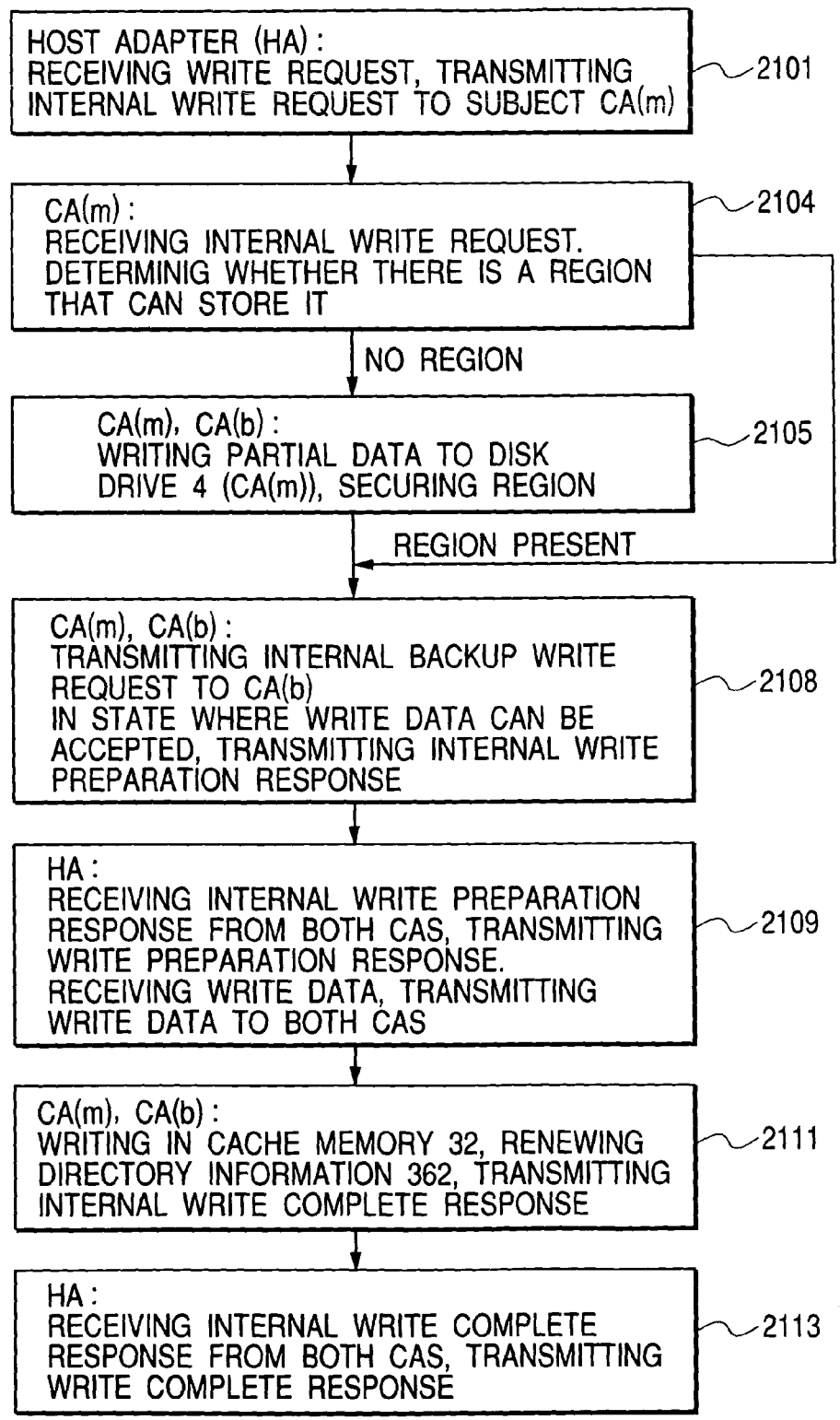
FIG. 5 is a flowchart showing a process flow of a write request.

FIG. 5 is a flowchart showing a process flow when the storage system receives a write request of data from the host computer 6. The backup cache adapter is described as a CA(b) hereinbelow.

The HA1 receiving the write request from the host computer 6 via the channel 61 searches the LDEV number corresponding to the LU number included in the write request and the information of the CA(m) and CA(b) from the management table 11.

Thereafter, the HA1 transmits the internal write request to the searched CA(m) via the internal link 21 (step 2101). The CA(m) that receives the internal write request determines from the directory information 362 whether the cache memory 32 has a region that can store data (hereinafter referred to as "write data") corresponding to the write request (step 2104).

If there is no region capable of storing, the CA(m) decides, based upon the LRU algorithm or the like, which data corresponding to which LDEV and LDEV address in the cache memory 32 is written in the disk drive 4, then, writes the data in the disk drive 4 and thereafter, invalidates the corresponding region to thereby secure the region that can store the write data. Further, the CA(m) informs the CA(b) of the LDEV number and LDEV address of the invalidated data.

The CA(b) that is informed invalidates the corresponding data to secure the region that can store the write data. After that, the CA(b) informs the CA(m) that the region is secured. It is to be noted that, since the cache memory 32 of the CA(b) has stored the data same as that in the CA(m) (the address may be different) as to the write data, the determine result performed at the step 2104 can be applied as it is to the determine for the storage region in the CA(b) (step 2105).

After the step 2105 or in a case where the step 2104 determines that there is a storage region, the CA(m) transmits to the CA(b) an internal backup write request that is an internal message corresponding to the internal write request received at the step 2105. When each of the CA(m) and the CA(b) are brought into a state where it can accept the write data, it transmits an internal write preparation response that is the internal message to the HA that has transmitted the internal write request. It is to be noted that the CA(b) may transmit to the CA(m) the internal write preparation response instead of transmitting the internal write preparation response to the HA1 and the CA(m) may collectively transmit the internal write preparation response to the HA1 (step 2108).

The HA1 receiving from both of the CA(m) and CA(b) (from CA(m) in a case where the CA(m) collectively responds) the internal write preparation response transmits a write preparation response to the host computer 6 via the channel 61. Thereafter, the HA1 receiving the write data transmitted from the host computer 6 according to the write preparation response transmits the write data to the CA(m) and CA(b) via the internal link 21 (step 2110).

The CA(m) and CA(b) receiving the write data writes the received write data into the region in the cache memory 32 secured in the abovementioned step to thereby renew the corresponding directory information 362. Thereafter, the CA(m) and CA(b) transmit via the internal link 21 an internal write complete response to the HA1 that has transmitted the internal write request (step 2111).

The HA1 receiving the internal write complete response from both of the CA(m) and CA(b) transmits a write complete response to the host computer 6 via the channel 61 (step 2113).

Explained hereinbelow are two methods for a region allocation of the cache memory 32, taking an operation among four cache adapters 3 as an example. For simplifying the explanation, a write cache region that stores the write data is only illustrated hereinbelow to be explained among storage regions possessed by each cache memory 32. However, the cache memory 32 has actually a read cache region too for storing the read data. Further, each cache adapter is referred to as CA1, 2, 3 and CA4 for distinguishing the cache adapters 3.

Figure 6:
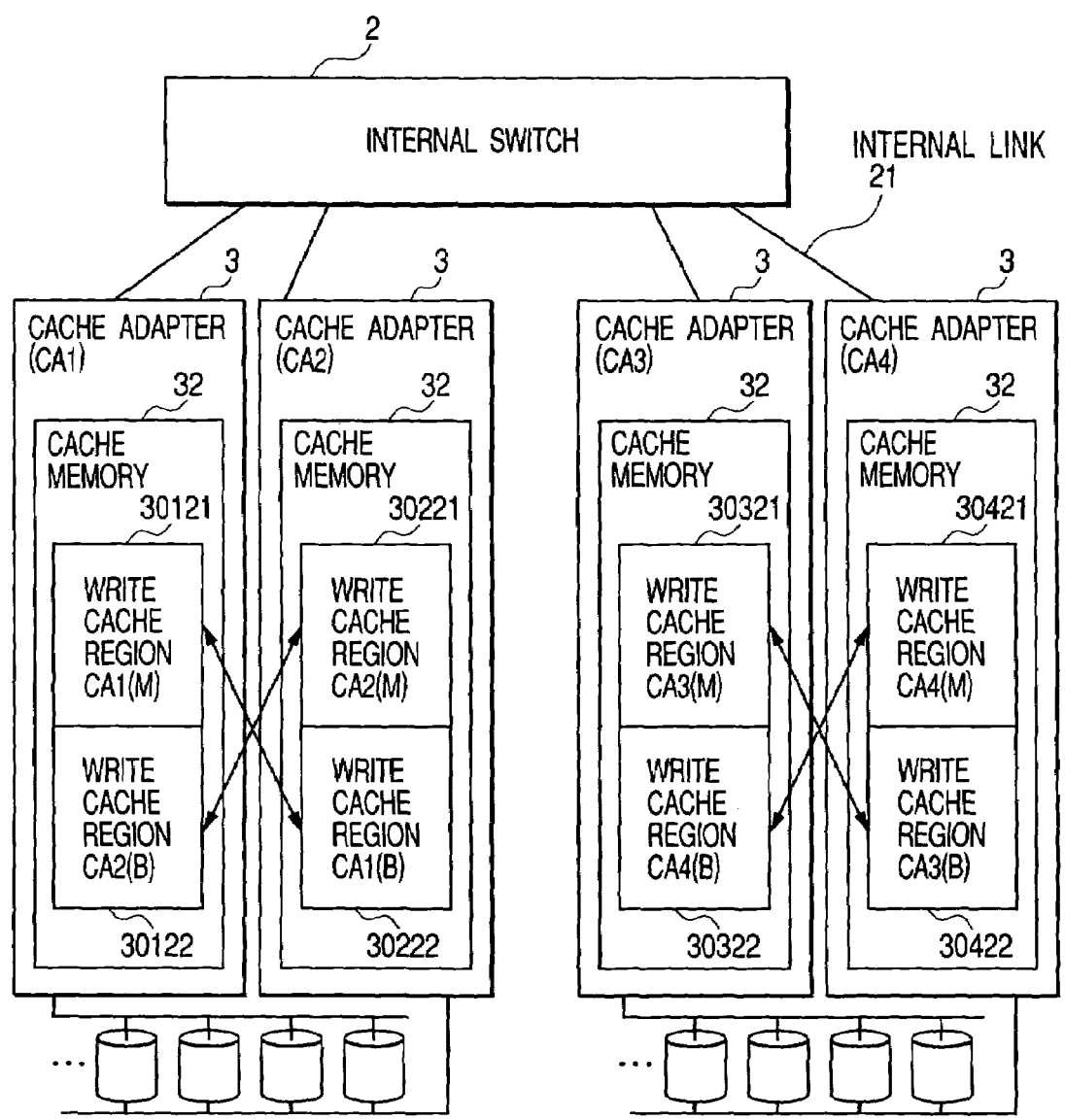
FIG. 6 is a view showing an arrangement of a region allocation of a cache memory in a normal state.

FIG. 6 is a view showing the allocation of the storage region in the cache memory among the cache adapters 3 in a normal state where a failure does not occur. In this figure, the CA1 and CA2 as well as the CA3 and CA4 become pairs connected to the common disk drive 4 for ensuring the redundancy (this relationship is referred to as "cache adapter pair"). The cache memory 32 in the CA1 has a write cache region CA1(M)30121 having stored therein data that the CA1 should execute the staging operation and destaging operation as the master cache adapter and a write cache region CA2(B)30122 having stored therein a copy of the write data as the backup cache adapter of the CA2.

Hereinbelow, the storage region where the data handled by the master cache adapter is called a master region and represented by (M), while the storage region where the data (copied data) handled by the backup cache adapter is called a backup region and represented by (B).

The cache memory 32 of the CA2 that is a cache adapter pair of the CA1 includes a write cache region CA2(M)30221 and a write cache region CA1(B)30222. Accordingly, the data included in the write cache region CA1(M)30121 is the same as the data included in the write cache region CA1(B)30222 (the address and the order may be different).

Specifically, in this figure, two cache adapters 3 that form the cache adapter pair provide the storage region for storing the copy of the each other's data to the cache memory 32 to thereby make the write data of the cache adapter pair redundant. Arrows in this figure represent the relationship among the abovementioned copy of the data. Like the cache adapter pair of the CA1 and CA2, the cache adapter pair of the CA3 and CA4 makes redundant the data stored in both cache memories 32.

Figure 7:
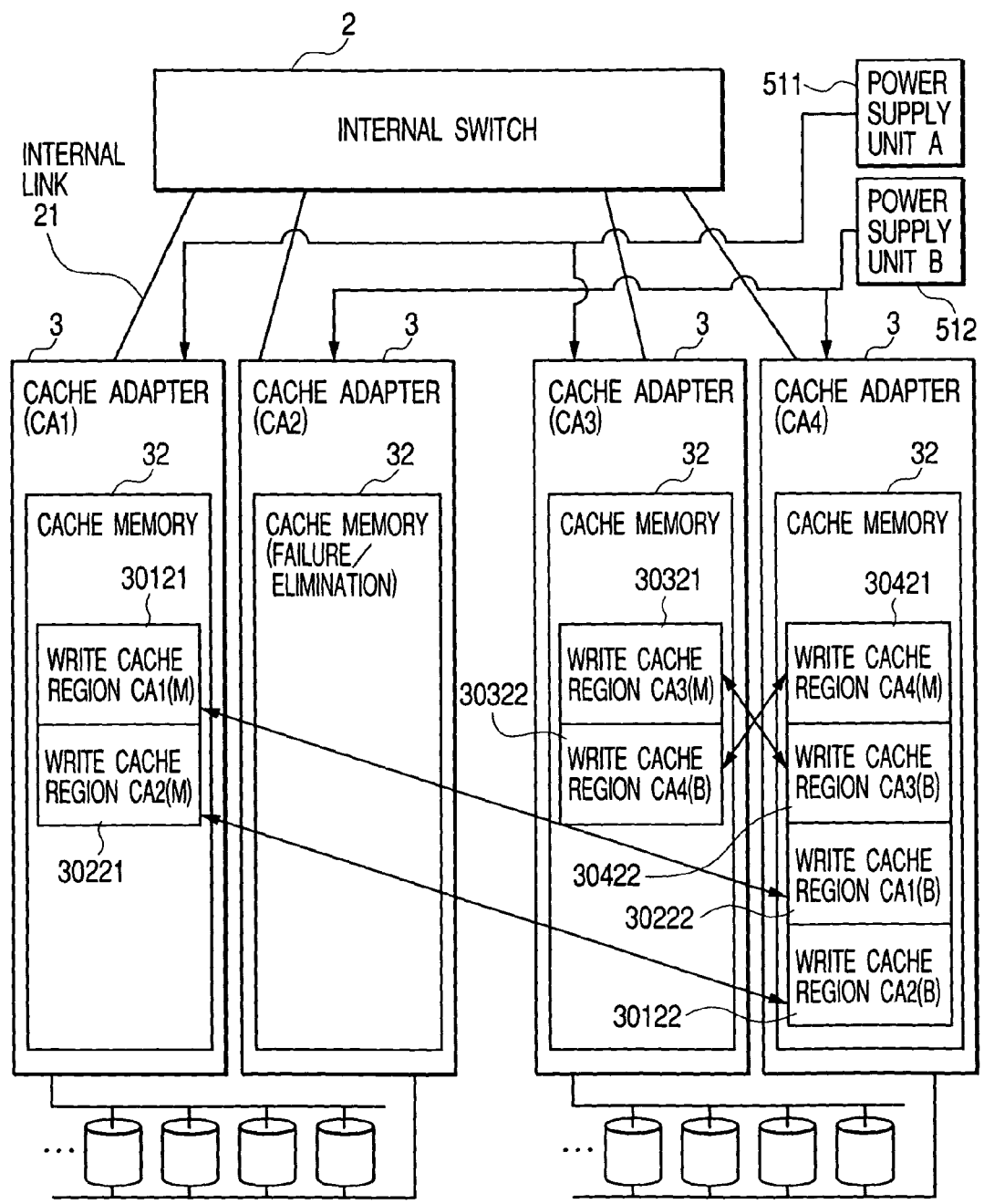
FIG. 7 is a view showing an arrangement of a region allocation of the cache memory in a case where a failure occurs in a CA2.

FIG. 7 is a view showing the allocation of the storage region in the cache memory in a case where the cache memory 32 possessed by the CA2 becomes unusable due to a cause that a failure occurs therein or the cache memory is eliminated therefrom. Two power supply units A511 and B512 respectively supply electric power to the CA1, CA3 and CA2, CA4 so that the operation can be continued even if the failure occurs in one of the power supply units. When the cache memory 32 possessed by the CA2 becomes unusable, the CA1 handles as the master region of the CA2 the copy of the master region of the CA2 possessed by the CA1, i.e., the CA2(B). Specifically, the CA1 operates also as the master cache adapter as for the write cache region CA2(M)30221.

On the other hand, the write cache region CA1(B)30222 and the write cache region CA2(B)30122 that are the backup regions arranged in the CA2 and the CA1 are arranged in the CA4. Specifically, a copy of the data stored in the cache memory 32 in the CA1 is stored in the cache memory 32 in the CA4. This makes the data stored in the cache adapter 3 redundant by the cache adapter 3 other than the cache adapter pair even if one cache adapter 3 becomes unusable.

The copy of the data of the CA1 can be arranged in the CA3 instead of the CA4, but electric power is supplied to either one of the master region and the backup region by arranging the copy of the data in the CA4 to which electric power is supplied from the power supply unit B512 that is different from the power supply unit A511 supplying electric power to the CA1 even if the failure further occurs in either one of the power supply units, thereby being free from losing the write data.

It is to be noted that, in a case where the capacity of the cache memory 32 in the CA4 is the same as that in the CA1, all data possessed by the CA1 cannot be stored in the cache memory 3042 in the CA4 (a normal use of the CA4 becomes impossible), so that the CA1 destages half of the data stored in the cache memory 32 to the disk drive 4 and then, arranges the copy of the remaining data in the CA4. The data amount to be destaged may not particularly be a half, but a half amount is desirable in view of the cache hit ratio of the cache memories 32 in the CA1 and the CA4.

Figure 8:
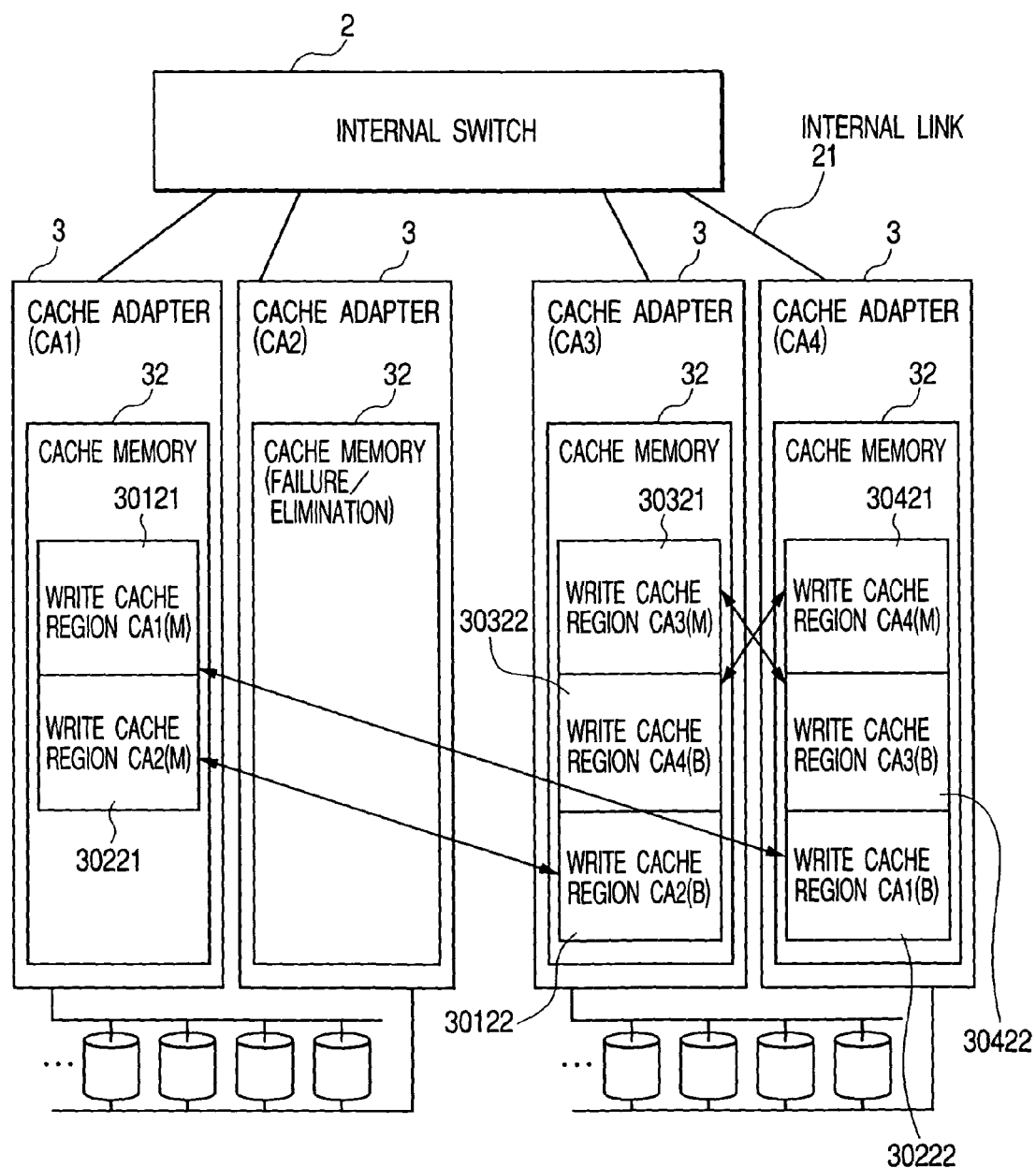
FIG. 8 is a view showing an arrangement of a region allocation of the cache memory in a case where a failure occurs in the CA2.

FIG. 8 is a view showing another example of the allocation of the storage region of the cache memory in the state same as that shown in FIG. 7. FIG. 8 is the same as FIG. 7 in the data storing method to the CA1, but is different from FIG. 7 in the arrangement of the copy of the data stored in the CA1. Specifically, the write cache region CA1(B)30222 and the write cache region CA2(B)30122 that are the backup regions arranged in the CA2 and the CA1 before the CA2 becomes unusable are arranged in the CA4 and CA3 respectively.

In this case, sufficient data amount destaged by the CA1 is, unlike FIG. 7, a third of the original storage region. This is because the region occupied by the copy of the data of the CA2 in the individual cache adapter 3 is decreased since, unlike FIG. 7, the copy of the data stored in the CA1 is dispersed to be arranged in the cache memories of the CA4 and CA3. This enables to make the write data redundant by the cache memory 32 even if one cache memory 32 becomes unusable, thereby enlarging the write cache region compared to the case of FIG. 7.

Figure 11:
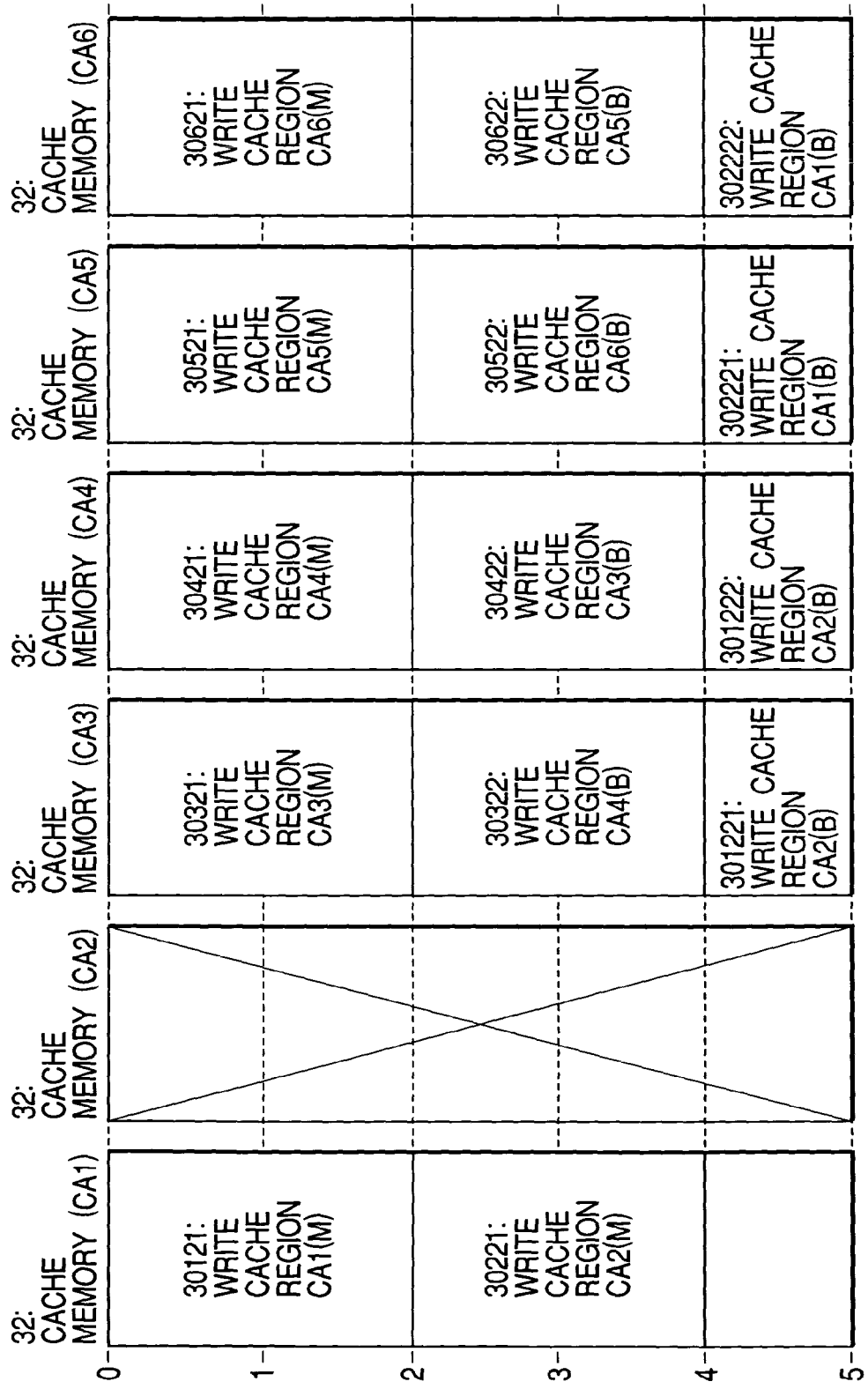
FIG. 11 is a view showing a comparison in size of a write cache region.

FIG. 11 is a view showing another example of the allocation of the storage region of the cache memory. In this example, new cache adapter pair composed of a CA5 and CA6 is newly added, whereby the size of the write cache region per one cache adapter 3 can be enlarged compared to the other cases even with the backup data of the CA1 stored therein when some cache adapter 3 becomes unusable. FIG. 11 shows the arrangement example of the region allocation of the cache memory in a case where a backup region is placed in four cache adapters 3. However, there is no limitation on the number of the cache adapter to which the backup region is allocated.

FIG. 9(A) is a view showing one example of the master management table 71 possessed by the manager adapter 7. The master management table 71 includes a cache adapter corresponding table 711 and a cache adapter pair table 712. The cache adapter corresponding table 711 has plural entries. Each entry has fields 7111, 7112 and 7113 having registered therein the LDEV number and information about the master cache adapter and backup cache adapter.

It is to be noted that registered in the master management table 71 is information about the LDEV of the entire disk controller 5. On the other hand, registered in the management table 31 possessed by the cache adapter 3 is only information about the LDEV that should be processed by its cache adapter 3 as the master cache adapter and backup cache adapter.

The cache adapter pair table 712 has plural entries. Each entry includes fields 7121 and 7122 having registered therein information about the cache adapter pair and failure support cache adapter.

The failure support cache adapter is a cache adapter 3 that is in charge of storing the backup region in a case where a failure occurs in the corresponding cache adapter 3 that is one of the cache adapter pair in the same entry. For example, the backup regions of the CA1 and CA2 are provided in the CA3 and CA4 in a case where the failure occurs in the CA2 in the first entry of the cache adapter pair table 712 of FIG. 9(A), which consequently shows that the arrangement of the storage region of the cache memory becomes the one shown in FIG. 8.

FIG. 9(B) shows the cache adapter corresponding table 711 having its content changed based upon the cache adapter pair table 712 in a case where the failure occurs in the CA2 from the state shown in FIG. 9(A). A half-tone dot meshing sections in the table are the changed sections. In the field 7112 in which the information of the master cache adapter is registered, the information of the field having registered therein the information for designating the CA2 that is the cache adapter 3 having the failure occurring is changed to the CA1 that is the cache adapter pair, and in the field 7113 in which the information of the backup cache adapter is registered, the sections in which the information for designating the CA2 and CA1 are changed to the CA3 and CA4 according to the information of the failure support cache adapter registered in the cache adapter pair table 712.

Figure 10:
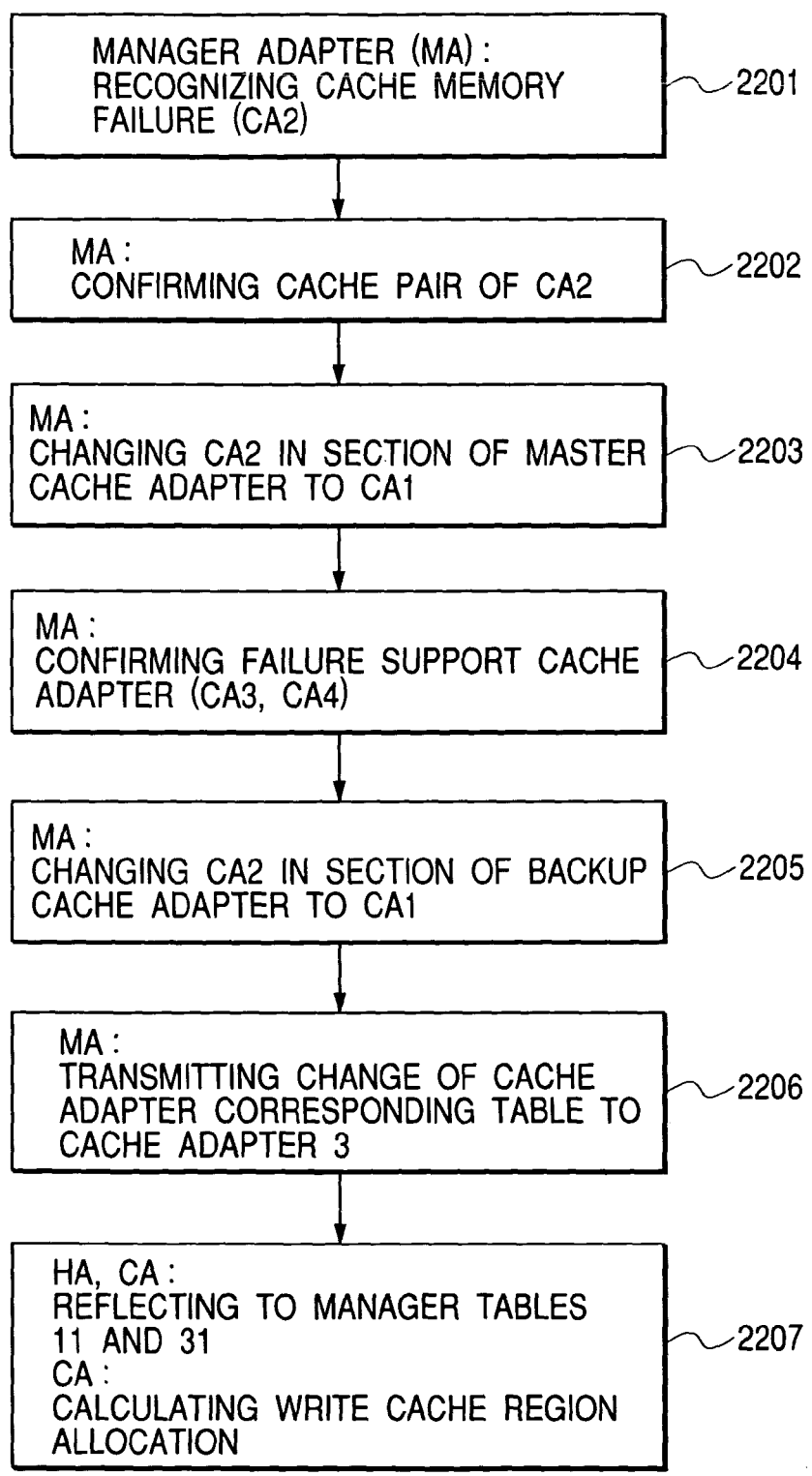
FIG. 10 is a flowchart including a processing in a manager adapter 7 when a failure occurs in the CA2.

FIG. 10 is a view showing a procedure of the manager adapter 7 (hereinafter referred to as "MA") in a case where the failure occurs in the CA2.

Firstly, the MA recognizes the occurrence of the failure in the CA2. Specifically, the MA recognizes the occurrence of the failure in the cache memory 32 in the CA2 by the report of the occurrence of the failure in the cache memory 3022 in the CA1, the report from the host adapter 1 that transmits the internal message to the CA2 but cannot obtain the response due to the failure, or the periodical check of the total disk controller 5 by the MA or the direction from the administrator via a management interface (not shown) connected to the MA (step 2201).

The MA recognizing the failure of the CA2 confirms by the cache adapter pair table 712 of the master management table 71 that the cache adapter pair of the CA2 is the CA1 (step 2202), and scans the field 7112 of the cache adapter corresponding table 711 to thereby change the section designating the CA2 as the master cache adapter to the CA1 that is the cache adapter pair (step 2203).

Subsequently, the MA confirms from the cache adapter pair table 712 that the failure support cache adapter of the cache adapter pair (CA1, CA2) is (CA3, CA4) (step 2204). Then, the MA scans the field 7113 of the cache adapter corresponding table 711 to change the content of the section designating the CA1 and CA2 to the CA3 or the CA4 that is the failure support cache adapter (step 2205).

Thereafter, the MA transmits the information in the entry whose content is changed in the cache adapter corresponding table 711 to the host adapter 1 and the cache adapter 3 registered in the fields 7112 and 7113 that are before the change or after the change of the changed entry (step 2206).

The host adapter 1 or the cache adapter 3 receiving this transmitted information reflects the transmitted information to the management table 11 or the management table 31 possessed by itself. Further, the cache adapter 3 calculates the allocation of the write cache region of the cache memory 3 (step 2207). It is to be noted that the processing at the step 2207 will later be described in detail. As described above, the MA detects the failure of the cache adapter 3, changes the setting of the backup cache adapter and transmits the changed information to the entire system. By this, the host adapter 1 can change the access to the LU that uses the CA2 as the master cache adapter to the CA1 and the CA1 can take over the staging operation and destaging operation to the disk drive 4 that is handled by the CA2.

Figure 12:
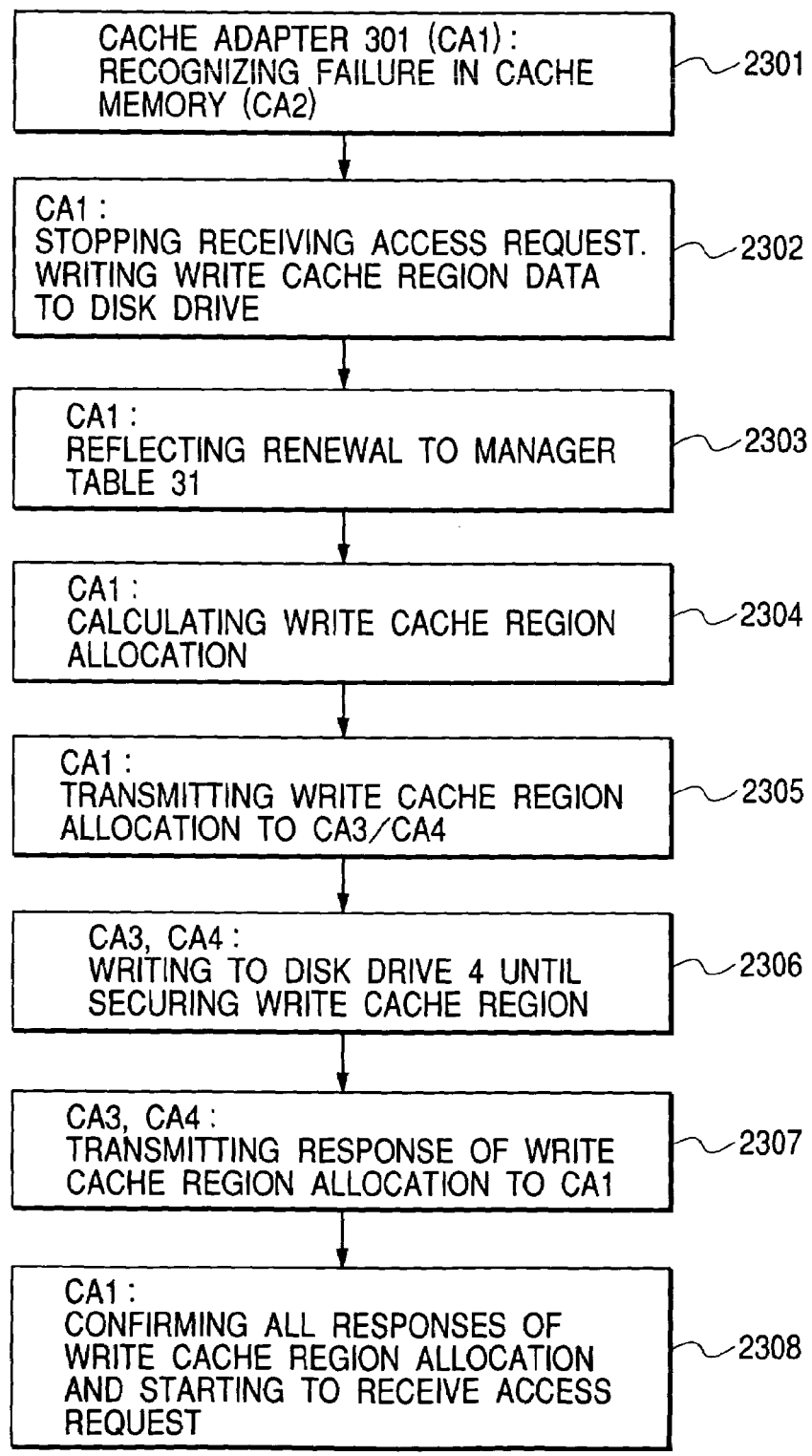
FIG. 12 is a flowchart showing a processing of the other cache adapter in a case where a failure occurs in the CA2.

FIG. 12 is a view showing a procedure in the cache adapter 3 that receives the information transmitted from the MA when the failure occurs in the CA2.

Firstly, the CA1 that is the cache adapter pair of the CA2 recognizes the occurrence of the failure from the report from the CA2 or the host adapter 1 transmitting the internal message, or the investigation of the MA or the direction from the administrator via the MA (step 2301).

The CA1 recognizing the occurrence of the failure stops receiving the access request to the LDEV managed by the CA1 and the CA2, and writes the data stored in the write cache region in the cache memory 3012 in the disk drive 4 (step 2302). Thereafter, it receives from the MA a part of the information (only the section relating to the CA1) of the entry in the renewed cache adapter corresponding table 711 and reflects it to the management table 31 (step 2303).

The CA1 calculates the allocation of the write cache region of the cache memory 3 based upon the reflected content. Specifically, if the number of the failure support cache adapter registered in the entry 7122 is m, the write cache region that can be used for one cache adapter 3 other than the region used for the data backup becomes m/(2 m+2) of all the write cache regions (step 2304).

The CA1 transmits a write cache region allocation request that is the internal message to the failure support cache adapter that is the backup cache adapter, here the CA3 and CA4 (step 2305). The CA3 and CA4 receiving the write cache region allocation request writes the data in the cache memory 3 to the disk drive 4 until the requested write cache region for performing the backup of the data in the CA1 and the CA2 can be secured (step 2306).

The CA3 and the CA4 that secure the write cache region requested by the CA1 transmits a write cache region allocation response that is the internal message to the CA1 (step 2307). The CA1 confirms the write cache region allocation responses from all cache adapters 3 that has transmitted the write cache region allocation request, and restarts the receipt of the access request to the LDEV that is stopped at the step 2302 (step 2308).

As a result, the data written in the cache memory in the CA1 is backed up by the CA3 or the CA4, thereby ensuring the redundancy. It is to be noted that, although the write of data is performed in the aforesaid procedure, the subject that the write data is backed up is not the CA2 but the CA3 or the CA4.

Figure 13:
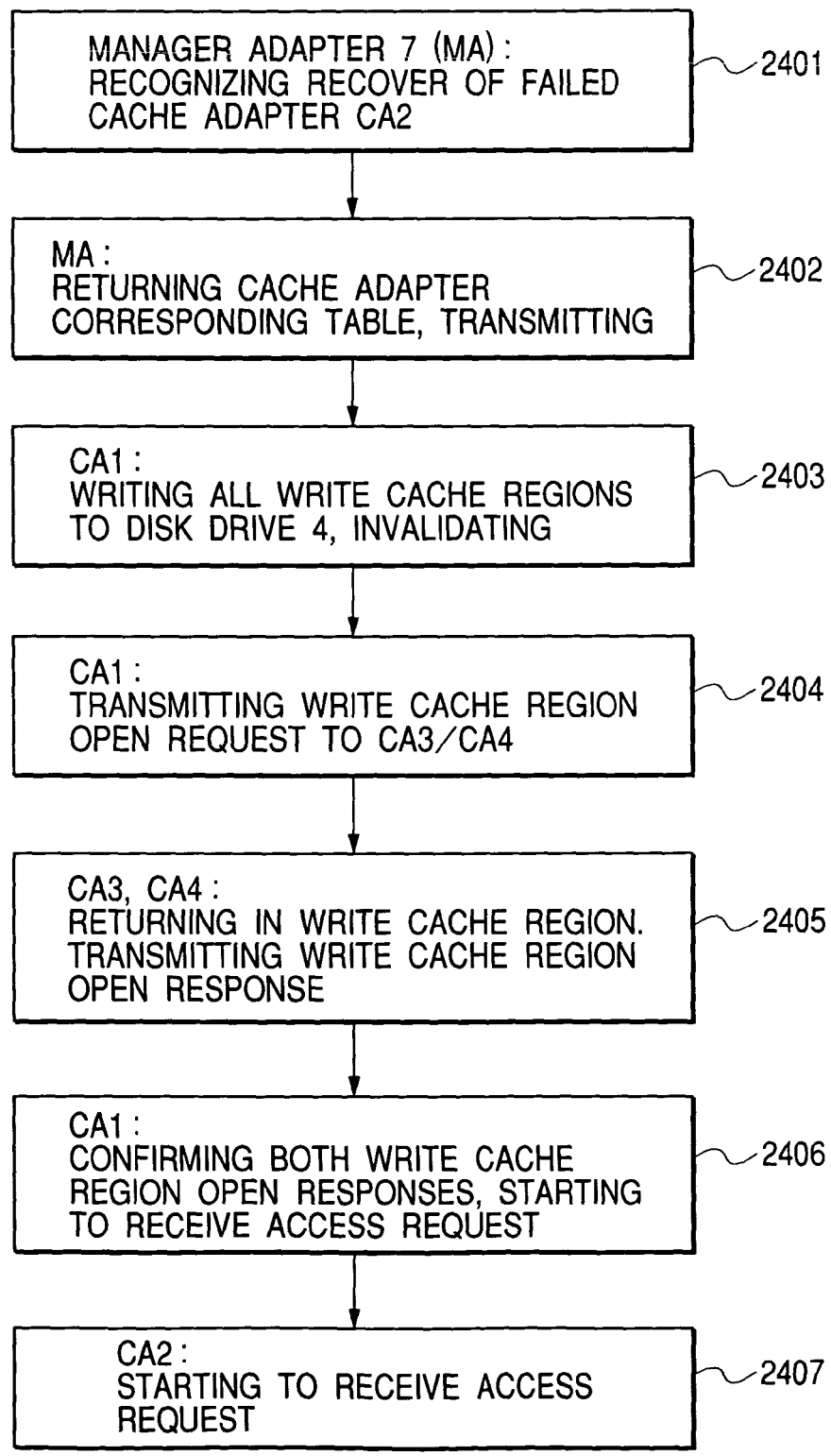
FIG. 13 is a flowchart showing a processing when the CA2 is recovered from the failure occurring therein.

Subsequently explained is a process in a case where the cache memory 32 in the cache adapter 3 having the failure occurring is recovered. FIG. 13 is a view showing a procedure when the CA2 is recovered from the failure occurring therein.

The MA recognizes the recovery of the CA2 from the direction from the administrator or the like (step 2401), changes the cache adapter corresponding table 711 to the state before the failure occurs in the CA2 and transmits the changed information to each host adapter 1 and the cache adapter 3 by the internal message. It is to be noted that the state of the cache adapter corresponding table 711 before the occurrence of the failure is stored in a memory possessed by the MA. Further, the MA informs the CA1 that is the cache adapter pair of the CA2 of the recovery from the failure of the CA2 by using the internal message (step 2402).

The informed CA1 writes all data stored in the write cache region in the CA1 to the disk drive 4 for invalidating the data in the write cache region (step 2403), and then, the CA1 transmits a write cache region open request that is the internal message to the CA3 and the CA4 that are the failure support cache adapters that have performed the operation of the backup cache adapter (step 2404).

The CA3 and CA4 receiving the write cache region open request opens the write cache region corresponding to the backup region of the CA1 and the CA2, changes the write cache region to the master region and backup region respectively of the CA3 and the CA4 before the occurrence of the failure and transmits to the CA1 a write cache region open response. It is to be noted that the information of the master region and the backup region of the CA3 and the CA4 before the occurrence of the failure is stored in the MA, and the CA3 and CA4 communicate with the MA by using the internal message to thereby obtain the information for changing the configuration of the cache memory 32 (step 2405).

The CA1 confirming the write cache region open response from the CA3 and the CA4 transmits an operation start request that is the internal message to the CA2 for starting the receipt of the access request to the LDEV that is handled by the CA1 (step 2406). The CA2 receiving the operation start request starts the receipt of the access request to the LDEV in which the CA2 becomes the master cache adapter and the processing as the backup cache adapter (step 2407).

Subsequently explained is a processing for recovering from the failure without losing the write data even in a case where the failure occurs in the cache memories 32 in both cache adapters composing the cache adapter pair.

Figure 14:
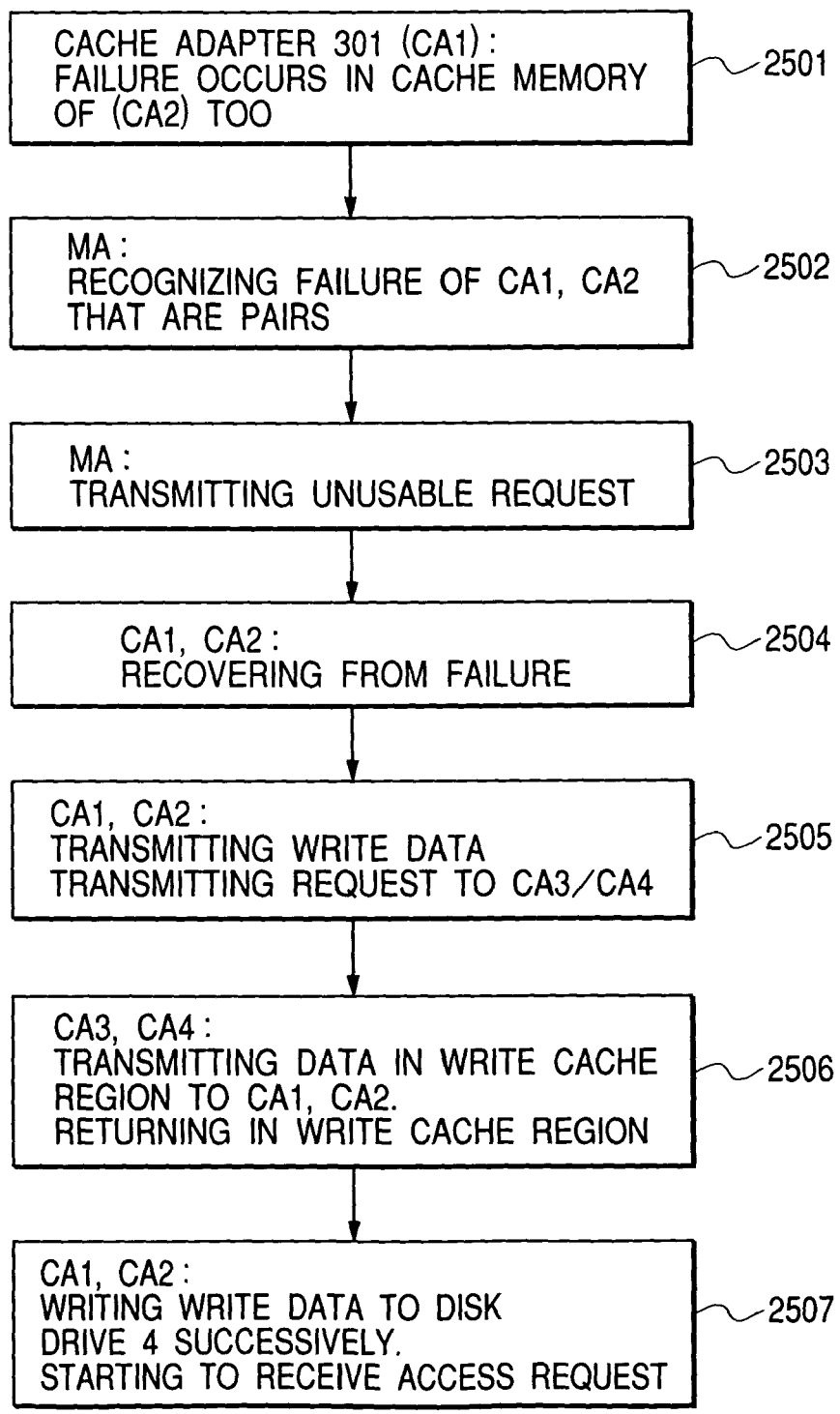
FIG. 14 is a flowchart showing a processing when a failure occurs in a cache adapter pair and it is recovered from the failure.

FIG. 14 is a view showing a procedure from the occurrence of the failure in the CA1 and the CA2 that form the cache adapter pair to the recovery from the failure by exchanging the cache adapter 3. In this embodiment, the explanation is made supposing that, with the state where the failure occurs in either one of the CA1 and the CA2 and the data that should be stored in the cache memories in the CA1 and the CA2 is backed up in the CA3 and the CA4, the failure occurs in the remaining CA.

Firstly, the failure occurs in both of the CA1 and the CA2 that form the cache adapter pair (step 2501).

The MA recognizes the occurrence of the failure in the cache memories 32 in both CA1 and the CA2 that form the cache adapter pair from the report from the CA1, CA2 or the host adapter 1, the investigation from the MA or the direction from the administrator (step 2502).

In this case, the MA transmits to the host adapter 1 an unusable request of the LDEV in which the CA1 and the CA2 are the master cache adapters. The host adapter 1 receiving the unusable request returns an error showing non-accessible to the host computer 6 that requests the access to the corresponding LDEV (step 2503). The CA1 and the CA2 are exchanged to the new cache adapters 3 from this state by a maintenance engineer, whereupon the disk drive 4 is connected to the disk channel 41 as it was and a setting is made so that the new cache adapters 3 are recognized as the CA1 and the CA2 from the entire disk controller 5, whereby the cache memories 32 of the CA1 and the CA2 are recovered from the failure (step 2504).

The CA1 and CA2 recovered from the failure transmit a write data transmitting request that is the internal message to the CA3 and the CA4 that are the failure support cache adapters and have performed the backup cache adapter operation (step 2505). The CA3 and the CA4 receiving the write data transmitting request transmit the data stored in the write cache region corresponding to the backup region of the CA1 and CA2 respectively. After transmitting all data stored in the corresponding write cache region, the CA3 and the CA4 release the corresponding write cache region to change the write cache region to the master region and backup region of the respective CA3 and CA4 that are before the failure occurs in the CA1 and the CA2 (step 2506).

The CA1 and the CA2 write the write data received from the CA3 or the CA4 to the disk drive 4 one after another, and after all write data is processed, they start to receive the access request to the LDEV handled by each CA (step 2507).

Explained so far is about the process for allocating the storage region of the cache adapter 3 under the leadership of the MA. However, it is possible to execute the abovementioned process only by each host adapter 1 and each cache adapter 3.

Figure 15:
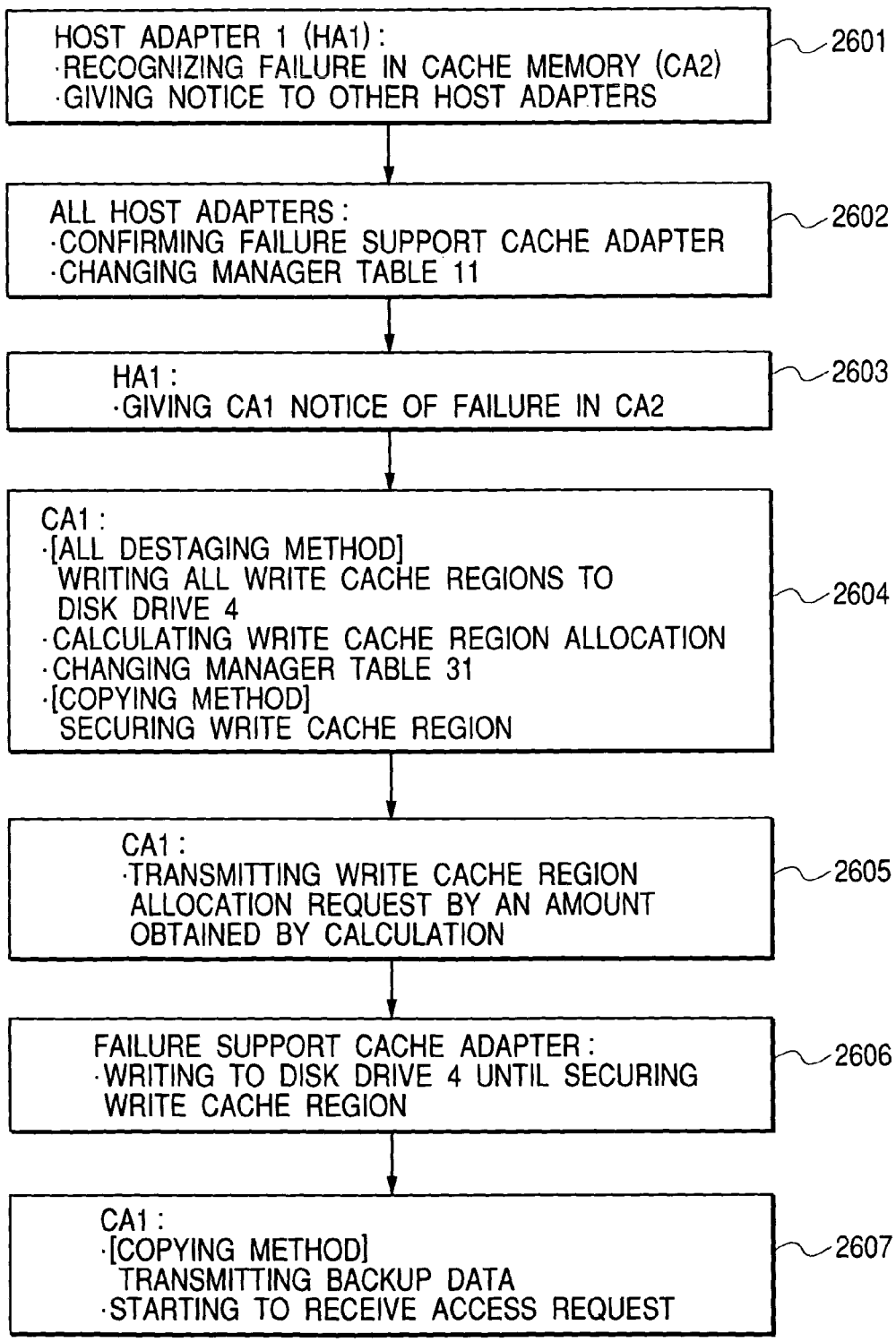
FIG. 15 is a flowchart showing a processing performed not through the manager adapter 7 in a case where a failure occurs in the CA2.

FIG. 15 is a view showing an embodiment of a process for allocating the storage region of the cache adapter 3 wherein the MA is not used in a case where the failure occurs in the cache memory 32 in the CA2. In this case, each host adapter 1 and each cache adapter 3 has in its own management table 11 and the management table 31 the cache adapter corresponding table 711 and the cache adapter pair table 712 corresponding to the cache adapter 3 to which each one can get access.

Moreover, the explanation so far describes the process method for firstly writing to the disk drive 4 all write data stored in the cache memory 32 in the other cache adapter 3 of the cache adapter pair when the failure occurs in the cache memory 32, but a method may be applied wherein all write data is not written in the disk drive 4. Here, the former method is called an all destaging method, while the latter one is called a copying method, and in this embodiment, processes in both methods will be explained.

It is to be noted that the copying method can be executed in the process explained so far via the MA. Which method is selected is determined depending upon the balance between the process time and the reliability. The procedure shown in FIG. 16 will be explained hereinbelow.

The host adapter 1 (hereinafter referred to as "HA1") recognizes the failure in the cache memory 32 in the CA2 from the internal read request, the response to the internal write request or the like, and informs all other HA1s of the failure of the CA2 by the internal message (step 2601). The informed all HA1s confirm that the cache adapter pair of the CA2 is the CA1 and its failure support cache adapter based upon the cache adapter pair table 712 possessed by each HA1, and change the CA2 in the field 1122 in the management table 11 to the CA1 as well as the CA2 or the CA1 in the field 1123 to its failure support cache adapter (step 2602). Further, the HA1 finding the failure informs the CA1 of the failure in the CA2 by the internal message (step 2603).

The informed CA1 performs the following process according to the set method. In the case of the all destaging method, the CA1 writes to the disk drive 4 all data stored in the write cache region for invalidating this write cache region. Subsequently, it calculates the allocation of the write cache region based upon the number of the failure support cache adapter to thereby change the management table 31. On the other hand, in the case of the copying method, the CA1 calculates the allocation of the write cache region without invalidating all write cache region, and then, writes to the disk drive 4 the write data as much as the requested write cache region can be secured, thereby invalidating the corresponding write cache region (step 2604).

Subsequently, the CA1 transmits to the failure support cache adapter that becomes the backup cache adapter the write cache region allocation request by an amount obtained by the calculation with the internal message (step 2605). The failure support cache adapter receiving the write cache region allocation request writes the write data in the cache memory 3 to the disk drive 4 as much as the requested write cache region can be secured, thereby invalidating the cache region (step 2606).

It is to be noted that, in the copying method, the CA1 transmits here the data stored in the write cache region to the failure support cache adapter. In a case where the transmission is completed or in the case of the all destaging method, the receipt of the access request to the corresponding LDEV is started in all cache adapters (step 607).

As described above, in the present invention, a pair of a controller (cache adapter) provided with a cache memory having the same disk drive is connected via a network, thereby establishing a large-scale configuration of a storage system, and between the pair of the controller, stored in the cache memory of one controller is a copy of write data in the cache memory in the other controller, thereby making each controller redundant to enhance reliability.

Further, when a failure occurs in the cache memory, the controller in which the failure occurs and the controller that uses jointly the disk drive with the other controller perform a staging and destaging, while the other normally operating controller is caused to perform only the operation of making the write data redundant, whereby the write access response speed and reliability before the occurrence of the failure are maintained.

According to the present invention, reliability is enhanced in a storage system having a cache memory. Further, a write access response speed and reliability before the occurrence of the failure are maintained in the storage system having the cache memory.

What is claimed is:

1. A storage system connected to a computer comprising:
   a first control unit, a second control unit, a third control unit and plural storage units, wherein
   said first control unit, said second control unit and said third control unit each has a memory, and
   said first control unit stores data received from said computer in the memory possessed by the first control unit and the memory possessed by said second control unit wherein said first control unit stores the data received from said computer in the memory possessed by the first control unit and the memory possessed by said third control unit in a case where said second control unit becomes unusable.

2. A storage system according to claim 1, wherein said second control unit stores the data received from said computer in the memory possessed by said second control unit and the memory possessed by said first control unit.

3. A storage system according to claim 2, wherein said first control unit receives the data from said computer instead of said second control unit when said second control unit becomes unusable and said first control unit stores said received data in the memory possessed by said first control unit and the memory possessed by said third control unit.

4. A storage system according to claim 1, further comprising a fourth control unit, said fourth control unit having a memory, wherein
said first control unit receives the data from said computer instead of said second control unit when said second control unit becomes unusable and said first control unit stores said received data in the memory possessed by said first control unit and the memory possessed by said fourth control unit.

5. A storage system according to claim 4, wherein said first control unit and said second control unit receive a power source supply from different power sources.

6. A storage system according to claim 5, wherein said third control unit and said fourth control unit receive a power source supply from different power sources.

7. A storage system according to claim 4, further comprising a switch connecting each of said first control unit, said second control unit, said third control unit and said fourth control unit, wherein each of said control units is connected to said computer via said switch.

8. A storage system according to claim 7, further comprising an interface unit, wherein
said switch is connected to said computer via said interface, and
said interface unit, said switch, said first control unit, said second control unit, said third control unit and said fourth control unit compose a single controller.

9. A storage system according to claim 8, further comprising a management device, wherein said management device is connected to said interface unit, said first control unit, said second control unit, said third control unit and said fourth control unit.

10. A storage system according to claim 9, wherein said management device has information showing a relationship between said plural storage units and said first control unit, said second control unit, said third control unit and said fourth control unit in the storage system, and
said interface unit, said first control unit, said second control unit, said third control unit and said fourth control unit execute storage of said data based upon said information.

11. A storage system according to claim 10, wherein, in a case where a failure occurs in any one of said first control unit, said second control unit, said third control unit and said fourth control unit, said information includes information designating the control unit having a memory that stores a copy of the data received by the control unit that is a substitute for the control unit in which said failure occurs and by the control unit in which said failure occurs.

12. A storage system according to claim 11, wherein, in a case where a failure occurs in any one of said first control unit, said second control unit, said third control unit and said fourth control unit, said management device detects said failure and changes said information depending upon a state of said failure and informs said interface unit, said first control unit, said second control unit, said third control unit and said fourth control unit of the occurrence of said failure and the change of said information, and said interface unit, said first control unit, said second control unit, said third control unit and said fourth control unit operate based upon said changed information.

13. A storage system according to claim 12, wherein, in a case of a recovery from said failure, said management device informs said interface unit, said first control unit, said second control unit, said third control unit and said fourth control unit of the recovery from said failure.

14. A storage system according to claim 8, wherein each of said interface unit, said first control unit, said second control unit, said third control unit and said fourth control unit has information showing a relationship between said plural storage units and said first control unit, said second control unit, said third control unit and said fourth control unit in the storage system, and
said interface unit, said first control unit, said second control unit, said third control unit and said fourth control unit execute the storage of said data based upon said information.

15. A storage system according to claim 14, wherein, in a case where a failure occurs in any one of said first control unit, said second control unit, said third control unit and said fourth control unit, said interface unit detects said failure and changes said information depending upon the state of said failure and informs said first control unit, said second control unit, said third control unit and said fourth control unit of the occurrence of said failure and the change of said information, and said first control unit, said second control unit, said third control unit and said fourth control unit operate based upon said changed information.

16. A storage system according to claim 3, wherein, when a failure occurs in said second control unit, said first control unit transfers the data stored in said first control unit to the memory of said third control unit.

17. A storage system according to claim 3, wherein, when a failure occurs in said second control unit, said first control unit stores the data stored in said first control unit in said storage unit.

18. A storage system according to claim 3, wherein, when a failure occurs in said second control unit, said third control unit and said fourth control unit store a part of the data stored in the memory possessed by said third control unit and the memory possessed by said fourth control unit in said plural storage units so as to receive the data from said first control unit.

19. A storage system according to claim 8, wherein, when a failure occurs in said first control unit and said second control unit, said interface unit reports an error to an access from said computer to said storage unit that is managed by said first control unit.

20. A storage system according to claim 8, further comprising a management device, wherein
said management device is connected to said interface unit, said first control unit, said second control unit, said third control unit and said fourth control unit without through said switch.

* * * * *